United States Patent

[11] 3,618,885

| [72] | Inventor | Johannes Muller<br>Schlankreye 37, 2 Hamburg 13, Germany |
|---|---|---|
| [21] | Appl. No. | 833,441 |
| [22] | Filed | June 16, 1969 |
| [45] | Patented | Nov. 9, 1971 |
| [32] | Priority | June 15, 1968 |
| [33] | | Germany |
| [31] | | P 17 73 637.7 |

[54] COLLAPSIBLE STAND
22 Claims, 11 Drawing Figs.

[52] U.S. Cl. .................................................. 248/460, 211/178 A, 248/435
[51] Int. Cl. ............................................. A47b 97/04
[50] Field of Search ........................................... 248/166, 168, 169, 170, 171, 434, 435, 159, 463–465, 460–462; 211/178 A

[56] References Cited
UNITED STATES PATENTS

| 786,530 | 4/1905 | Steetzer .................... | 248/170 |
| 992,908 | 5/1911 | Rummel .................... | 248/462 |
| 1,268,363 | 6/1918 | Lamont ...................... | 248/171 |
| 1,368,317 | 2/1921 | Zondlo ........................ | 248/461 |
| 1,421,779 | 7/1922 | Heerling ...................... | 248/435 X |
| 1,612,148 | 12/1926 | Oettinger ..................... | 248/166 X |
| 2,359,821 | 10/1944 | Black .......................... | 248/171 X |

*Primary Examiner*—J. Franklin Foss
*Attorney*—Michael S. Striker

ABSTRACT: A rodlike center support member slidably extends through a sleeve. The latter is provided on at least one end face with three or more angularly offset slots radiating from the bore of the sleeve. Each of the recesses receives an end portion of a contact or engaging member which is so secured in the respective recess that it can be moved from a position in which it extends radially outwardly from the bore inclined to the axis thereof to a position in which it extends in parallelism with its axis. When the stand is to be erected the sleeve is slid to the lower end of the central support member and the engaging members are moved to their radially outwardly extending position so that they can rest on the ground. When the stand is to be collapsed the sleeve is moved to the upper end of the central support member and the engaging members are moved to their position in parallelism with the axis of the bore in which they extend parallel to the elongated support member.

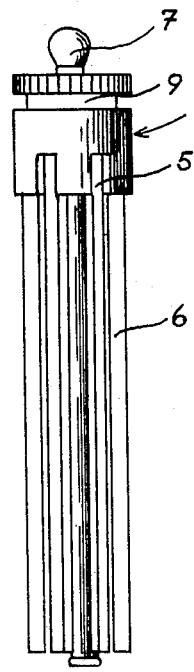
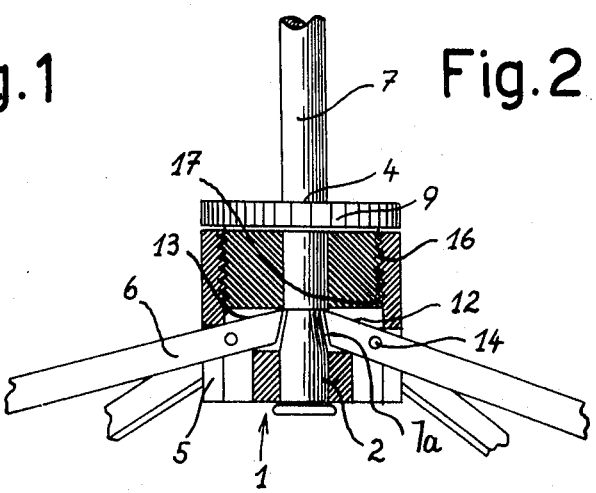
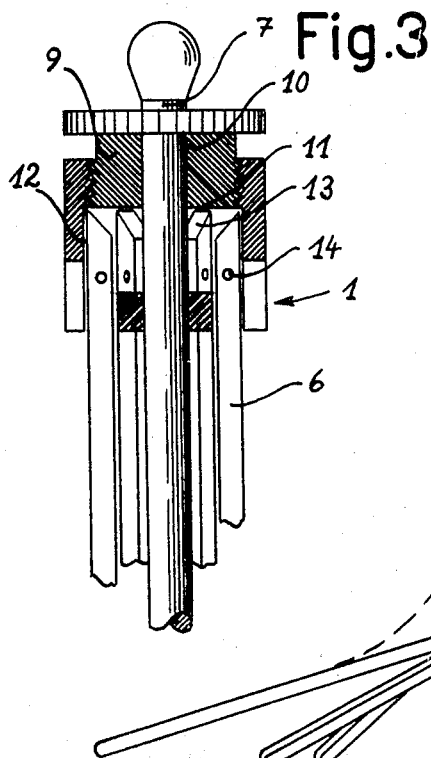
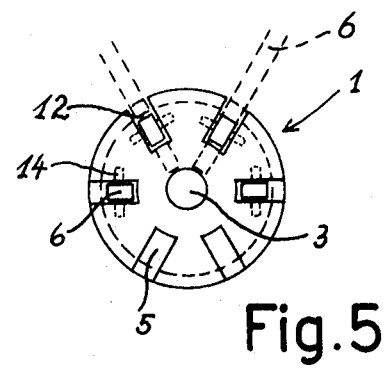
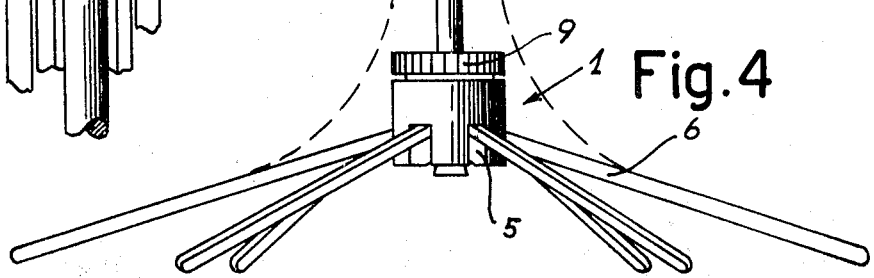

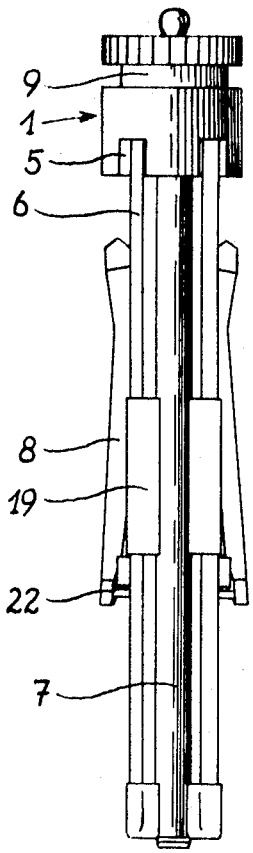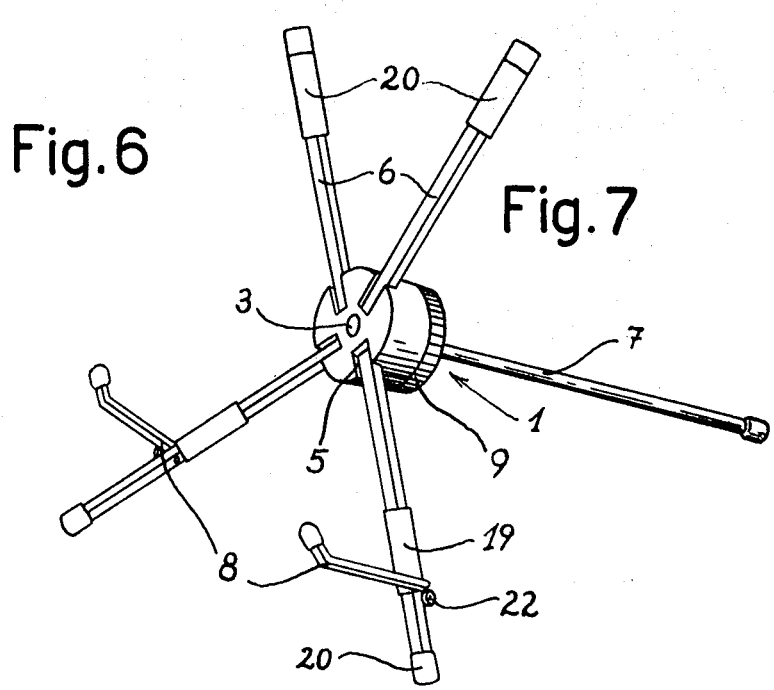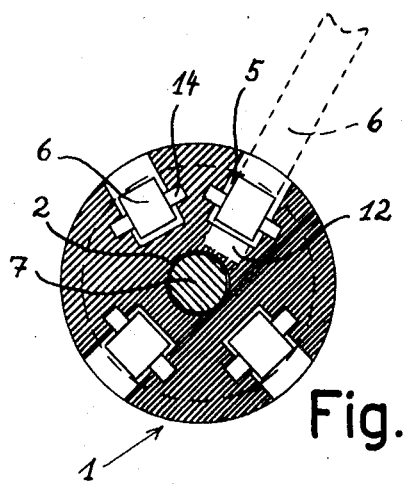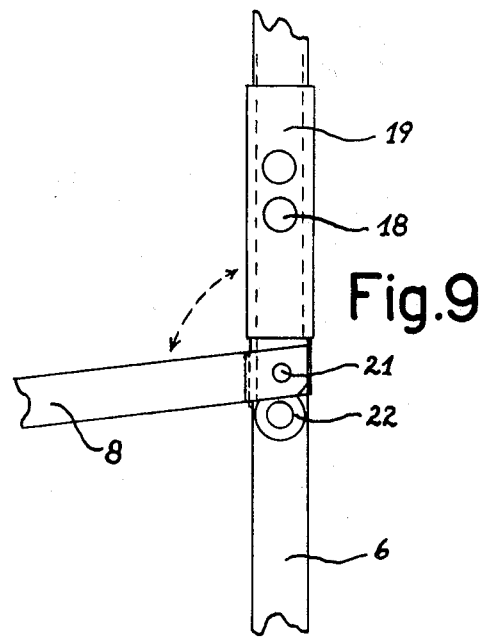

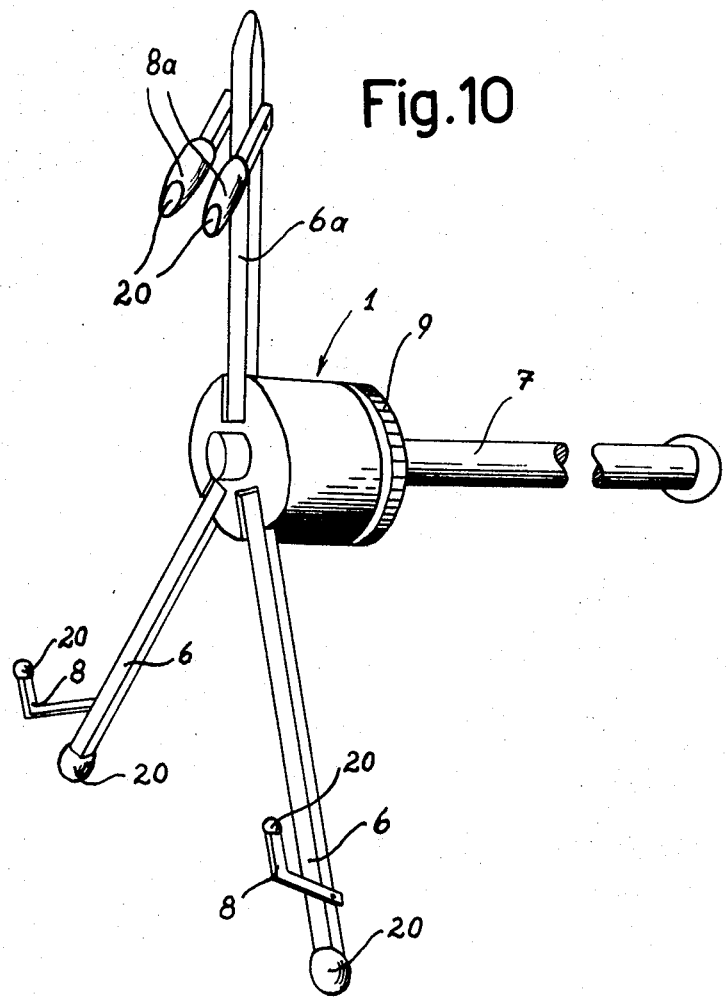

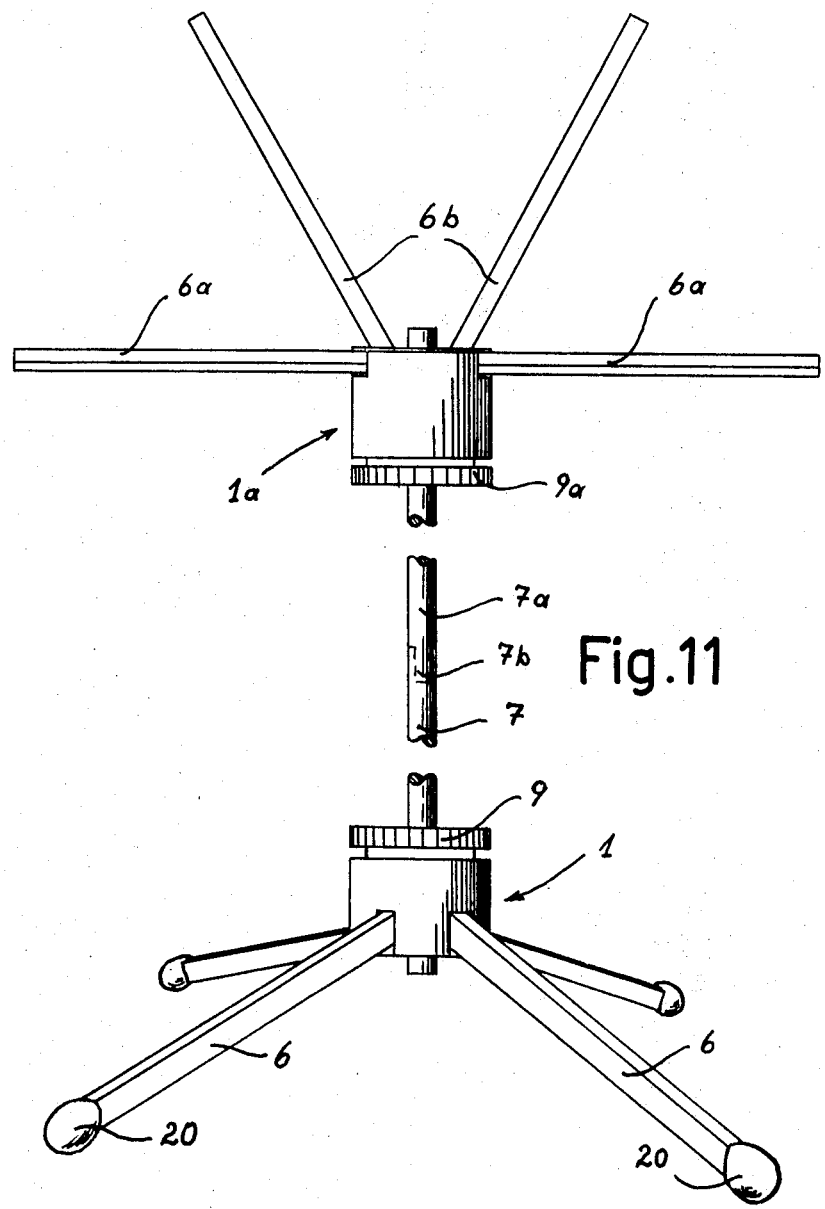

COLLAPSIBLE STAND

BACKGROUND OF THE INVENTION

The present invention relates to a collapsible stand, and more particularly to a collapsible stand for musical instruments, notes and the like.

Such stands generally comprise an upright and at least three ground-contacting members, and the upright—of which more than one may be provided—may further be provided with support arms for notes or the like. These prior art constructions suffer from some very decided disadvantages not the least of which is the fact that many of them are inadequately stable when they are erected and support an instrument and/or notes. Additionally, these collapsible stands can either be collapsed only to such an extent as to remain, even in collapsed condition, too large and bulky to be readily transportable in the small space offered by briefcases, suitcases, instrument cases and the like, or that they must be completely disassembled in order to make possible an adequate reduction in their size. The latter operation is of course time-consuming and difficult and must subsequently be reversed when the stand is to be erected.

All of this is evidently a disadvantage, particularly in view of the fact that the increased mobility of musicians—that is the increased frequency of single engagements—evidently requires a correspondingly frequent collapse and subsequent setting up of the equipment.

SUMMARY OF THE INVENTION

It is, accordingly, an object of the present invention to overcome these disadvantages.

More particularly it is an object of the present invention to provide an improved collapsible stand, particularly for musical instruments, notes and the like, but also suitable for other applications, which is not possessed of these disadvantages.

A concomitant object of the invention is to provide such a stand which can be rapidly and in simple manner collapsed and subsequently set up, and which in collapsed condition will require very little space while, when it is set up, it has great stability.

In pursuance of the above objects and others which will becomes apparent hereafter, one feature of my invention resides in the provision of a collapsible stand having a journal member provided with oppositely directed end faces and with an open-ended bore extending from one to the other of these end faces. One of the end faces is provided with at least three axial recesses spaced circumferentially and extending radially of the bore. At least three elongated ground-engaging members are provided and each have an end portion received and journaled in one of these axial recesses so that the members are pivotable between an operative position in which they extend radially of the bore and are inclined to the axis of the same, and a collapsed position in which they extend in at least substantial parallelism with the axis of the bore. Finally, an elongated support member—which may also be though of as an upright, although it is not necessarily used in such position—is provided which has a first and second end portion and which is received in the bore slidable between an extended position in which the journal member surrounds the first end portion and the ground-engaging members, when they are in their operative position, support the stand with the support member in position, and a retracted position in which the journal member surrounds the second end portion and the major portion of the support member is located between and in axial parallelism with the ground-engaging members when the latter are in their collapsed position.

Of course, according to the invention means may also be provided for arresting the ground-engaging members in one or both of the positions, or in any position intermediate these positions.

It will be evident that the number of ground engaging members provided will depend on the type and size of instrument or the article which is to be carried by the stand, just as the dimensions of these members will depend upon this factor. Thus, if the stand is to support clarinets, trumpets and similar instruments with straight line sound opening it is advantageous to provide between three and six of these ground-engaging members which are symmetrically positioned circumferentially of the bore in the journal member. The instrument is simply placed downwardly over the end of the elongated support member so that the same extends upwardly in the instrument and supports the same. The ground-engaging members are usually of identical length and their particular length as well as their number in the particular case depends upon the length and the weight of the instrument which the stand is to carry.

If such instruments as guitars, bongos, mandolins and similar stringed instruments, as well as saxophones are to be supported, it is advantageous that three or four of the ground-engaging members be provided. In this case two of these will be capable of movement to their operative position and will support the stand in conjunction with the lower end portion of the support member which in this embodiment will not be upright but downwardly inclined to the ground which it contacts with its second end. The other one or two of the ground-engaging members will then be used for supporting purposes for the instrument in that they are extended upwardly in direction away from the ground in the manner which is still to be described in detail. In this case additional supporting arms are advantageously provided on the ground-engaging members which actually contact the ground and are pivotal outwardly so as to constitute a support for the instrument, that is for the body of the instrument whereas the neck of the instrument is located between the upwardly extending support member and the one or two upwardly extending ground-engaging members which for this purpose had better be identified simply as engaging members.

Other specific embodiments for other specific purposes are also possible and will be described in more detail by way of example hereafter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a side elevational view showing one embodiment of the novel stand in collapsed condition;

FIG. 2 is an enlarged partially sectioned fragmentary detail view of the embodiment in FIG. 1;

FIG. 3 is another enlarged partially sectioned fragmentary detail view of the embodiment in FIG. 1, but showing the ground-engaging members in the position which they assume in the illustration of FIG. 1;

FIG. 4 is a diagrammatic perspective view of the embodiment of FIG. 1 but showing it in erected condition;

FIG. 5 is a somewhat schematic view from the underside of the journal member shown in FIGS. 2 and 3;

FIG. 6 is a view substantially similar to FIG. 1, but partly sectioned, illustrating a further embodiment of the invention in collapsed condition;

FIG. 7 is a perspective view of the embodiment of FIG. 6, but in erected condition;

FIG. 8 is a cross section through the journal member of the embodiment of FIGS. 6 and 7;

FIG. 9 is a somewhat schematic fragmentary side elevational detail view, on an enlarged scale, illustrating a detail of the embodiment in FIGS. 6 and 7;

FIG. 10 is a perspective view of a third stand which constitutes a modification of the stand shown in FIGS. 6 to 9; and FIG. 11 is an elevational view of a further stand.

DESCRIPTION OF THE PREFERRED EMBODIMENTS

Discussing now firstly the embodiment illustrated in FIGS. 1–5 it is emphasized that this embodiment is particularly suitable for supporting such instruments as clarinets. It comprises a journal member 1 having an axial bore 2 extending from one to the other axial end of the member 1. One of the axial ends of the member 1, that is the one which faces downwardly in FIG. 2, is provided with a plurality of axial recesses radiating from the bore 2; in the illustrated embodiment there are six such recesses 5 provided and each accommodates an end portion of an elongated supporting or engaging member 6. In this embodiment the recesses 5 are equiangularly spaced and are of course slightly wider than the width of the end portions of the engaging members 6. Reference numeral 14 identifies journal means with which the members 6 are pivotably journaled in the respective recesses 5 so that they can be moved between a collapsed position in which they extend in parallelism with the axis of the bore 2, as shown in FIG. 1, to an extended or erected position as shown in FIGS. 2 and 4, in which they extend at a downward angle with respect to the axis of the bore 2.

A center support member 7 of generally rod or bar-shaped configuration is shown in FIGS. 1–4 and slidably surrounded by the member 1.

Upwardly above the recesses 5 the member 1 is provided with an axial depression or recess formed with an internal screw thread 16 which meshes with a corresponding external screw thread 17 provided on a cover 9 so that the latter can be threaded into the member 1. The cover 9 is provided with a bore 10 coaxial with the bore 2 and as illustrated the support member 7 extends of course also through the bore 10.

It is shown in FIG. 2 that in the illustrated embodiment the inner free ends of the members 6 are further provided with abutment portions 12 and 13 which are so configurated that, when the cover 9 is threaded into the member 1 to a predetermined extent they will abut the underside of the cover 9 (compare FIG. 3) whereby the members 6 are prevented—when located in collapsed positon—from moving out of this position towards their operative or erected position. Conversely, and as shown in FIG. 2, these portions 12 and 13 can also be utilized for maintaining the members 6 in their operative position to prevent them moving to their collapsed position, and for this purpose the lower end portion of the member 7 may be provided with a recess or a plurality of recesses 7a such as is diagrammatically illustrated in FIG. 2 and into which these portions 12 and 13 can extend when the cover 9 is threaded to a predetermined extent into the member 1. This, as is evident from FIG. 2, will then prevent also sliding of the member 1 with respect to the support member 7, or vice versa.

The embodiment of FIGS. 1–5 is illustrated in FIG. 4 in erected condition. From this figure, wherein a forward portion of a wind instrument, such as a clarinet, has been shown in broken lines, it will be evident that the instrument is supported on the stand.

The embodiment illustrated in FIGS. 6–9 is particularly suited for stringed instruments, such as guitars or the like. It is quite reminiscent of the embodiment in FIGS. 1–5, but differs therefrom in that only four of the axial recesses are provided and extend radially of the bore in the member 1, but are arranged at different circumferential distances, rather than being equiangularly spaced. This is evident from FIG. 8. Of the corresponding four engaging members 6, two serve as ground-engaging members in conjunction with the support member 7, whereas the other two members 6 extend upwardly at an acute angle with reference to one another and are intended to receive between them the neck of the stringed instrument. To support the body of the instrument the two ground-engaging members 6 are provided with support arms 8 which are pivotable about pivot axes 22 extending substantially normal to the elongation of the ground-engaging members 6. As shown, arrangements 19 may be provided which make it possible to slide the arms 8 longitudinally of the respective members 6 to provide for asymmetrical adjustment of the arms 8 if desired.

It is emphasized that in a modification of this embodiment, which is shown in erected condition in FIG. 7 and the slidable arrangement of the arms 8 of which is shown in FIG. 9, it is also possible to provide only a single upwardly extending engaging member which then may be provided with one or more arms similar to the ones shown in FIG. 7 which can be pivoted into a position of parallelism with one another extending outwardly from the single member 6 to receive between them the neck of the instrument. This is shown in FIG. 10 wherein the supporting member 6a carries arms 8a.

In accordance with a particularly simple and advantageous embodiment of the invention the arms 8 are simply connected to the members 6 by being mounted on a shaft 21 received in a transverse bore 18 in the members 6, a plurality of such bores 18 being provided to permit adjustment of the arms longitudinally of the respective members 6. An arresting device 22, shown in FIG. 9, prevents pivoting of the arms 8 beyond their desired operative end position.

In FIG. 7 the reference numeral 20 identifies suitable padding means provided on the members 6, the members 7 and the arms 8. This may be in form of caps consisting of suitable material, such as synthetic plastic or any other material suitable for the purpose. Such padding means 20 can also be provided at any and all other portions of the stand to protect the instrument against damage when it is placed onto and supported by the stand.

The stands shown in FIGS. 1 and 6 can be readily accommodated in small spaces and may be supplied with suitable covers for covering them in their collapsed condition. From the collapsed condition shown in FIGS. 1 and 6, respectively, the stands are converted to erected condition by unscrewing the cover 9 to a requisite extent, moving the members 6 to erected condition, drawing the member 7 longitudinally of the member 1 to its extended position, and screwing the cover 9 back into the member 1. Insofar as arms 8 are provided, they are moved to operative position, for instance as illustrated in FIG. 7. Evidently, to collapse the stand these operations are reversed.

It is clear from this that the stand can readily be set up and just as readily be collapsed into a very small package wherein the center support member 7 is located between the members 6 so that they together form a coaxial bundle.

It is emphasized that the movement of the cover 9 axially of the member 1 can be accomplished in other ways than by the illustrated screw threads 16 and 17 (see FIG. 2). For instance it is possible to use a bayonet-type closure which is well known to those skilled in the art, or other known instrumentalities effecting arresting of the cover 9 with respect to the member 1 when it has been slid to a predetermined position relative to the latter. The device 19 which permits sliding movement of the arms 8 relative to the members 6 need be only in form of a sleeve which engages the arms 6 with suitable friction so that sliding is impossible unless the user exerts a force strong enough to overcome the friction. However, other possibilities will offer themselves readily to those skilled in the art.

The support member 7, the engaging members 6 and arms 8 preferably consist of profiled metallic sections, particularly aluminum because of its light weight, with angled, curved, solid or tubular cross section. The journal member 1 may also consist of metallic material, again with aluminum being one possibility because of its light weight, or of a suitable synthetic plastic material, preferably of tenacious characteristics.

FIG. 11 shows a stand with two journals 1, 1a, a two-piece center support member 7, 7a whose sections are separably coupled to each other at 7b, supporting members 6 and 6a, 6b which are respectively pivotable with reference to the journals 1, 1a and covers 9, 9a. When moved to extended positions, the members 6a extend at right angles to the axis of the journal 1a. The supporting members 6b extend upwardly from the journal 1a when moved to the illustrated extend positions.

It will be understood that each of the elements described above, or two or more together, may also find a useful application in other types of constructions differing from the types described above.

While the invention has been illustrated and described as embodied in a collapsible stand, it is not intended to be limited to the details shown, since various modifications and structural changes may be made without departing in any way from the spirit of the present invention.

What is claimed as new and desired to be protected by Letters Patent is set forth in the appended claims.

1. A collapsible stand, particularly for musical instruments, comprising a journal member having spaced oppositely directed end faces and being provided with an open-ended bore extending from one to the other thereof, said journal member further having at least three axial recesses provided in one of said end faces spaced circumferentially and extending radially of said bore; at least three elongated engaging members each having an end portion received and journaled in one of said axial recesses, said engaging members being pivotable between an operative position in which they extend radially of said bore and are inclined to the axis of the same and a collapsed position in which they extend in at least substantial parallelism with the axis of said bore; an elongated support member having a first and a second end portion and being received in said bore slidable between an extended position in which said journal member surrounds said first end portion and in which said engaging members, when in said operative position, support said stand and a retracted position in which said journal member surrounds said second end portion of said support member and the major portion thereof is located between and in axial parallelism with said engaging members when the same are in said collapsed position; and arresting means operative for arresting said engaging members in said positions and in a plurality of intermediate positions.

2. A collapsible stand as defined in claim 1 wherein said axial recesses are equiangularly spaced.

3. a collapsible stand as defined in claim 1, said engaging members being inclined in direction away from the other of said end faces when in said operative position.

4. A collapsible stand as defined in claim 1, wherein said recesses are spaced at different angles from one another, said first end portion of said support member in conjunction with at least two of said engaging members being operative for supporting said stand and the remaining engaging members extending at an acute angle to one another and upwardly away from said two engaging members.

5. A collapsible stand as defined in claim 4; further comprising auxiliary supporting arms provided on said engaging members and pivotable radially outwardly about pivot axes which are respectively located in planes parallel with the pivot axes of the associated engaging members.

6. A collapsible stand as defined in claim 1; and further comprising an auxiliary journal member having an auxiliary bore accommodating a portion of said support member, said auxiliary journal member being provided with a plurality of auxiliary axial recesses angularly spaced from said auxiliary bore, and a plurality of elongated auxiliary supporting members each having an end portion journaled for pivoting movement in one of said auxiliary recesses, two diametrally opposite arms of said auxiliary supporting members being movable from a position of parallelism with said auxiliary bore to a position in which they extend at least substantially normal thereto, and the remaining auxiliary supporting members being movable from a position of parallelism with said bore to a position in which they are inclined thereto in direction away from the first-mentioned journal member.

7. A collapsible stand as defined in claim 1, wherein said journal member comprises a tubular portion provided with said recesses, and an insert portion provided with said bore and received in and secured to said tubular portion.

8. A collapsible stand as defined in claim 7, said insert portion having a radial face located within the confines of said tubular portion, and said engaging members having inner free ends located within said tubular portion and arranged to abut against said radial face when said engaging members are in collapsed position.

9. A collapsible stand as defined in claim 8, said insert portion being secured to said tubular portion movable in axial direction of the same at the will of a user to thereby effect movement of said radial face into abutment with said inner free ends for preventing said engaging members from moving towards said operative position.

10. A collapsible stand as defined in claim 9; further comprising mating screw threads provided in said tubular portion and said insert portion.

11. A collapsible stand as defined in claim 1; and further comprising auxiliary arm members associated with at least some of said engaging members and pivotable radially outwardly about pivot axes located in planes paralleling the pivot axes of the respective engaging members; and slidable means slidably connecting said arms with said engaging members for sliding movement longitudinally of the same.

12. A collapsible stand as defined in claim 1; and further comprising padding means provided on at least parts of at least some of said members.

13. A collapsible stand as defined in claim 1, wherein said journal member is composed of metal and said engaging members are profiled metallic members.

14. A collapsible stand as defined in claim 1, wherein said journal member is composed of tenacious synthetic plastic and said engaging members are profiled metallic members.

15. A collapsible stand, particularly for musical instruments, comprising a journal member having a first open-ended bore and at least three axial recesses spaced circumferentially and extending radially of said bore; an insert member releasably secured to said journal member and having a second open-ended bore axial with said first open-ended bore of said journal member; at least three elongated leg members each having an end portion received and journaled in one of said axial recesses and an inner free end located within said journal member, said leg members being pivotable between an operative position extending radially of said first bore and inclined away from said insert member, and a collapsed position extending substantially parallel with said first bore; an elongated support member having a first and a second end portion and being received in said coaxial first and second bores slidable between an operative position in which said bores surround said first end portion, and a retracted position in which said bores surround said second end portion and in which said first end portions is located between said leg members when the same are in said collapsed position; and said insert member being movable relative to said journal member in axial direction of the same and having a radial face adapted to abut against said inner free ends of said leg members for locking same against displacement in both their operative and their collapsed positions.

16. A collapsible stand as defined in claim 15; and further comprising mating new threads provided on and securing said journal member and said insert member together.

17. A collapsible stand as defined in claim 15; and further comprising auxiliary arm members mounted on at least some of said leg members for pivotal motion between a collapsed position substantially parallel to the respective leg member, and an operative position extending at about a right angle to the respective leg member, said auxiliary arm members being adapted to support a musical instrument.

18. A collapsible stand as defined in claim 17, wherein at least some of the pivots of said auxiliary arm members are slidably mounted on said leg members for adjustment longitudinally of the same.

19. A collapsible stand as defined in claim 15; and further comprising arresting means for arresting said support member in at least its operative position.

20. A collapsible stand as defined in claim 19, wherein said support member is provided with at least one recess and said inner free ends of said leg members are provided with abutment portions adapted to extend into one of said recesses of the support member when said leg members are in their operative position.

21. A collapsible stand as defined in claim 15, wherein said first end portion of said support member in conjunction with two of said leg members is adapted to support said stand; said two leg members having auxiliary arm members adapted to support the rim of a musical instrument; and at least one further leg member extending in upward direction and being adapted to support the neck of a musical instrument.

22. A collapsible stand as defined in claim 21, wherein two of said leg members extend at an acute angle to one another in upward direction, being adapted to support the neck of a musical instrument therebetween.

* * * * *